US010880210B2

(12) United States Patent
Pianigiani et al.

(10) Patent No.: US 10,880,210 B2
(45) Date of Patent: Dec. 29, 2020

(54) CLOUD NETWORK HAVING MULTIPLE PROTOCOLS USING VIRTUALIZATION OVERLAYS ACROSS PHYSICAL AND VIRTUALIZED WORKLOADS

(71) Applicant: Juniper Networks, Inc., Sunnyvale, CA (US)

(72) Inventors: Jacopo Pianigiani, Cupertino, CA (US); Manish Krishnan, Sunnyvale, CA (US); Anantharamu Suryanarayana, San Jose, CA (US); Vivekananda Shenoy, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 40 days.

(21) Appl. No.: 16/232,656

(22) Filed: Dec. 26, 2018

(65) Prior Publication Data
US 2020/0213227 A1 Jul. 2, 2020

(51) Int. Cl.
*H04L 12/721* (2013.01)
*H04L 12/741* (2013.01)
(Continued)

(52) U.S. Cl.
CPC .......... *H04L 45/66* (2013.01); *G06F 9/45558* (2013.01); *H04L 12/4633* (2013.01);
(Continued)

(58) Field of Classification Search
CPC ......... H04L 45/64; H04L 45/66; H04L 45/74; H04L 45/586; H04L 12/4633;
(Continued)

(56) References Cited

U.S. PATENT DOCUMENTS 9,693,382 B2 * 6/2017 Kahn ................ H04W 76/16
9,838,268 B1 12/2017 Mattson
(Continued)

FOREIGN PATENT DOCUMENTS

CN 108259213 A * 7/2018 .......... H04L 43/0811
CN 108574613 A * 9/2018
(Continued)

OTHER PUBLICATIONS

Extended Search Report from counterpart European Application No. 19181143.9, dated Dec. 10, 2019, 12 pp.
(Continued)

*Primary Examiner* — Kostas J Katsikis
(74) *Attorney, Agent, or Firm* — Shumaker & Sieffert, P.A.

(57) ABSTRACT

Techniques are disclosed for configuring multiple network devices implementing different protocols or techniques. For example, these techniques allow network devices configured with different protocols to co-exist within the same network, or for the network to seamlessly evolve from one protocol to the other. Techniques described herein provide for an SDN controller that may bridge a network system implementing different protocols, e.g., Open vSwitch Database (OVSDB) and Ethernet Virtual Private Network (EVPN), by translating high-level configuration data (e.g., desired state of the network at a high level of abstraction) that are protocol agnostic to low-level configuration data (e.g., desired state of the network at a low level of abstraction) that are protocol specific. That is, SDN controller may provide management, control, and analytics functions of a virtualized network configured to operate specifically within an OVSDB environment and/or an EVPN environment.

20 Claims, 4 Drawing Sheets

(51) Int. Cl.
H04L 12/715 (2013.01)
H04L 12/713 (2013.01)
H04L 12/46 (2006.01)
G06F 9/455 (2018.01)

(52) U.S. Cl.
CPC ........ H04L 12/4641 (2013.01); H04L 45/586 (2013.01); H04L 45/64 (2013.01); H04L 45/74 (2013.01); *G06F 2009/45595* (2013.01)

(58) Field of Classification Search
CPC ............. H04L 12/4641; H04L 41/044; H04L 41/0226; G06F 9/45558; G06F 2009/45595
See application file for complete search history.

(56) References Cited

U.S. PATENT DOCUMENTS

| | | | | |
|---|---|---|---|---|
| 9,961,014 | B2* | 5/2018 | Huang | H04L 67/10 |
| 10,009,938 | B2* | 6/2018 | Kahn | H04W 72/0406 |
| 10,083,026 | B1* | 9/2018 | Venkata | G06F 8/65 |
| 10,200,274 | B1* | 2/2019 | Suryanarayana | H04L 45/02 |
| 10,257,089 | B2* | 4/2019 | Bays | H04L 49/70 |
| 10,411,951 | B2* | 9/2019 | Clark | H04L 41/0672 |
| 10,476,700 | B2* | 11/2019 | Moreno | H04L 12/66 |
| 10,530,873 | B1* | 1/2020 | Arya | H04L 12/44 |
| 10,560,390 | B2* | 2/2020 | Gammel | H04L 47/283 |
| 10,581,684 | B2* | 3/2020 | Smith | H04L 45/38 |
| 10,623,339 | B2* | 4/2020 | Wackerly | H04L 47/20 |
| 2015/0043382 | A1 | 2/2015 | Arora et al. | |
| 2015/0049631 | A1* | 2/2015 | Heron | H04L 45/02 |
| | | | | 370/254 |
| 2015/0250009 | A1* | 9/2015 | Kahn | H04W 76/16 |
| | | | | 370/329 |
| 2015/0350102 | A1* | 12/2015 | Leon-Garcia | H04L 41/12 |
| | | | | 709/226 |
| 2015/0381493 | A1* | 12/2015 | Bansal | H04L 45/306 |
| | | | | 370/392 |
| 2016/0156702 | A1* | 6/2016 | Morper | H04L 67/10 |
| | | | | 709/223 |
| 2016/0173371 | A1* | 6/2016 | Bays | H04L 49/602 |
| | | | | 370/389 |
| 2016/0249353 | A1* | 8/2016 | Nakata | H04W 28/16 |
| 2017/0026283 | A1* | 1/2017 | Williams | H04L 45/64 |
| 2017/0034224 | A1* | 2/2017 | Baram | H04L 65/605 |
| 2017/0063608 | A1 | 3/2017 | Wang et al. | |
| 2017/0093623 | A1* | 3/2017 | Zheng | H04L 12/2885 |
| 2017/0142028 | A1* | 5/2017 | Huang | H04L 47/808 |
| 2017/0295606 | A1* | 10/2017 | Kahn | H04W 72/0406 |
| 2018/0041363 | A1* | 2/2018 | Moreno | H04L 12/4633 |
| 2018/0212925 | A1* | 7/2018 | Huang | H04L 61/2007 |
| 2018/0241824 | A1* | 8/2018 | He | H04L 12/4641 |
| 2018/0375802 | A1* | 12/2018 | Wackerly | H04L 47/20 |
| 2019/0052549 | A1* | 2/2019 | Duggal | G06Q 30/04 |
| 2019/0097889 | A1* | 3/2019 | Browne | H04L 41/0806 |
| 2019/0173754 | A1* | 6/2019 | Smith | H04L 41/0836 |
| 2019/0253274 | A1* | 8/2019 | Van Dussen | H04L 41/0806 |
| 2019/0273681 | A1* | 9/2019 | Williams | H04L 45/586 |
| 2019/0273686 | A1* | 9/2019 | Gammel | H04L 45/20 |
| 2019/0273691 | A1* | 9/2019 | Gammel | H04L 43/04 |
| 2019/0296998 | A1* | 9/2019 | Shaikh | H04L 41/042 |
| 2019/0306018 | A1* | 10/2019 | Steverson | H04L 41/0806 |
| 2019/0349262 | A1* | 11/2019 | Miedema | H04L 41/12 |
| 2020/0084131 | A1* | 3/2020 | Bisht | H04L 43/12 |
| 2020/0099585 | A1* | 3/2020 | Chen | H04L 49/252 |

FOREIGN PATENT DOCUMENTS

| | | | | |
|---|---|---|---|---|
| WO | | 2013184846 A1 | 12/2013 | |
| WO | WO-2018218977 A1 * | | 12/2018 | ............. H04L 29/08 |

OTHER PUBLICATIONS

Lu et al., "HybNET: Network Manager for a Hybrid Network Infrastructure," ACM. Middleware 2013 Industry Track, Dec. 11-13, 2013, 6 pp.
Bjorklund, "YANG—A Data Modeling Language for the Network Configuration Protocol (NETCONF)," RFC 6020, Internet Engineering Task Force (IETF), Oct. 2010, 173 pp.
"Contrail Feature Guide" Contrail, Release 2.21, Juniper Networks, Inc., Jun. 13, 2016, 620 pp.
"OVSDB and VXLAN Feature Guide for MX Series Routers and EX9200 Switches" Junos OS, Juniper Networks, Inc., Dec. 12, 2018, 232 pp.
"Understanding the Junos OS Implementation of OVSDB and VXLAN in a VMware NSX for vSphere Environment" Tech Library, Junos OS, Juniper Networks, Inc., Jun. 10, 2018, 2 pp.
"Understanding the OVSDB Protocol Running on Juniper Networks Devices" Tech Library, Junos OS, Juniper Networks, Inc., Jun. 10, 2018, 2 pp.
Crockford, "The application/json Media Type for JavaScript Object Notation (JSON)" Network Working Group, RFC 4627, Jul. 2006, 9 pp.
"JSON-RPC 2.0 Specification" JSON-RPC Working Group, Jan. 4, 2013, 7 pp.
Pfaff et al. "The Open vSwitch Database Management Protocol Abstract" RFC 7047, Dec. 2013, 35 pp.
U.S. Appl. No. 15/198,657, filed Jun. 30, 2016, Juniper Networks, Inc. (inventor: Jiang) entitled "Translating High-Level Configuration Instructions to Low-Level Device Configuration".
U.S. Appl. No. 16/221,698, filed Dec. 17, 2018, Juniper Networks, Inc. (inventor: Shenoy) entitled "Network Device Configuration Using a Message Bus".
"Using TOR Switches and OVSDB to Extend the Contrail Cluster to Other Instances" Tech Library, Junos OS, Juniper Networks, Inc., Sep. 2, 2015, 8 pp.

* cited by examiner

CLOUD NETWORK HAVING MULTIPLE PROTOCOLS USING VIRTUALIZATION OVERLAYS ACROSS PHYSICAL AND VIRTUALIZED WORKLOADS

TECHNICAL FIELD

This disclosure generally relates to computer networks, and more specifically, to distributed applications.

BACKGROUND

A cloud data center is a data center that provides access to virtualized applications, services, and data storage to off-premises customers. In a typical cloud data center environment, there is a large collection of interconnected servers that provide computing (e.g., compute nodes) and/or storage capacity to run various applications. For example, a cloud data center comprises a facility that hosts virtualized applications and services for customers of the cloud data center.

The cloud data center for example, hosts all the infrastructure equipment, such as networking and storage systems, redundant power supplies, and environmental controls. In a typical cloud data center, clusters of storage systems and application servers are interconnected via high-speed network fabric provided by one or more tiers of physical network switches and routers. More sophisticated cloud data centers provide infrastructure spread throughout the world with subscriber support equipment located in various physical housing facilities. In some examples, the infrastructure of a cloud data center may include a combination of physical devices, which may be referred to as the "underlay resources," that are linked to and communicate with a variety of virtual resources such as virtual servers, agents, and/or policy controllers, which may be referred to as "overlay resources."

Software Defined Networking (SDN) platforms may be used in cloud data centers, and in some cases, may use a logically centralized and physically distributed SDN controller, and a distributed forwarding plane in virtual routers that extend the network from physical routers and switches in the cloud data center into a virtual overlay network hosted in virtualized servers. The SDN controller provides management control, and analytics functions of a virtualized network and orchestrates the virtual routers by communicating with the virtual routers.

The various network devices included in the network fabric typically include mechanisms, such as management interfaces, for locally or remotely configuring these devices. By interacting with the management interface of the network devices, an administrator or other user can manually perform configuration tasks to configure the devices, and the user can also manually perform operational commands on the devices to manage, collect, and/or view operational data of the devices. For example, the user may configure interface cards of the device, adjust parameters for supported network protocols, specify physical components within the device, modify routing information maintained by a router, access software modules and other resources residing on the device, and/or perform other configuration tasks. In addition, the user may also provide commands to view current operating parameters, system logs, information related to network connectivity, network activity, or other status information from the devices, as well as view and react to event information received from the devices.

In some cases, the network fabric may include multiple network devices, e.g., from different vendors. Vendors often provide different protocols for managing devices. For example, different vendors of routers may offer different protocols for configuring services performed by these routers.

SUMMARY

In general, the disclosure describes techniques for configuring multiple network devices that implement different protocols or techniques. For example, these techniques allow network devices configured with different protocols to co-exist within the same network (or data center), or for the network to seamlessly evolve from one protocol to the other. In one instance, one or more network devices of a data center may implement a first protocol to enable communication between virtual networks and physical networks, while one or more other network devices of the data center may implement a second protocol to enable communication between virtual networks and physical networks. In some examples, the first protocol may be a legacy protocol and the second protocol may be a non-legacy (new) protocol. For example, the first protocol may be, e.g., Open vSwitch database (OVSDB), and the second protocol may be, e.g., Ethernet Virtual Private Network (EVPN).

Techniques described herein provide for an SDN controller that may bridge a network system implementing different protocols, e.g., OVSDB and EVPN, by translating high-level configuration data (e.g., desired state of the network at a high level of abstraction) that are protocol agnostic to low-level configuration data (e.g., desired state of the network at a low level of abstraction) that are protocol specific. For example, the SDN controller may provide control plane based automation of services (e.g., virtual network overlays) by using, for example, the same tunneling for the overlays across virtual networks and physical networks. That is, SDN controller may provide management, control, and analytics functions of a virtualized network configured to operate within an OVSDB environment and/or an EVPN environment.

The techniques may provide one or more example technical advantages. For example, by providing an SDN controller to translate high-level configuration data that are protocol agnostic into low-level configuration data that are protocol specific, an administrator need not consider multiple factors associated with the underlying device infrastructure, such as network infrastructure and the technology or protocols of the network devices, when configuring network devices for a system in which network devices implementing multiple protocols co-exist and/or evolve from using one protocol to another.

In one example, a method includes receiving, by a software defined networking (SDN) controller, high-level configuration data that describes a desired state of a network managed by the SDN controller at a high level of abstraction, wherein a first network device of the plurality of network devices implements a first protocol and a second network device of the plurality of network devices implements a second protocol, wherein the first protocol and the second protocol are different protocols for communicating between a virtual network and a physical network, and wherein the high-level configuration data is protocol agnostic. The method also includes applying, by the SDN controller, a first transformation function to the high-level configuration data to generate a first low-level configuration data specific to the first protocol. The method also includes applying, by the SDN controller, a second transformation function to the high-level configuration data to generate a second low-level configuration data specific to the second protocol. The method further includes, in response to applying the first transformation function, outputting, by the SDN controller and using the first protocol, the first low-level configuration data to configure the first network device that implements the first protocol. The method further includes, in response to applying the second transformation function outputting, by the SDN controller and using the second protocol, the second low-level configuration data to configure the second network device that implements the second protocol.

In another example, a software defined networking (SDN) controller comprises a memory; one or more processors coupled to the memory, wherein the one or more processors are configured to: receive high-level configuration data that describes a desired state of a network managed by the SDN controller at a high level of abstraction, wherein a first network device of the plurality of network devices implements a first protocol and a second network device of the plurality of network devices implements a second protocol, wherein the first protocol and the second protocol are different protocols for communicating between a virtual network and a physical network, and wherein the high-level configuration data is protocol agnostic; apply a first transformation function to the high-level configuration data to generate a first low-level configuration data specific to the first protocol; apply a second transformation function to the high-level configuration data to generate a second low-level configuration data specific to the second protocol; output, in response to applying the first transformation function and using the first protocol, the first low-level configuration data to configure the first network device that implements the first protocol; and output, in response to applying the second transformation function and using the second protocol, the second low-level configuration data to configure the second network device that implements the second protocol.

In yet another example, a non-transitory computer-readable storage medium includes instructions for causing one or more programmable processors to: receive high-level configuration data that describes a desired state of a network managed by the SDN controller at a high level of abstraction, wherein a first network device of the plurality of network devices implements a first protocol and a second network device of the plurality of network devices implements a second protocol, wherein the first protocol and the second protocol are different protocols for communicating between a virtual network and a physical network, and wherein the high-level configuration data is protocol agnostic; apply a first transformation function to the high-level configuration data to generate a first low-level configuration data specific to the first protocol apply a second transformation function to the high-level configuration data to generate a second low-level configuration data specific to the second protocol; output, in response to applying the first transformation function and using the first protocol, the first low-level configuration data to configure the first network device that implements the first protocol; and output, in response to applying the second transformation function and using the second protocol, the second low-level configuration data to configure the second network device that implements the second protocol.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
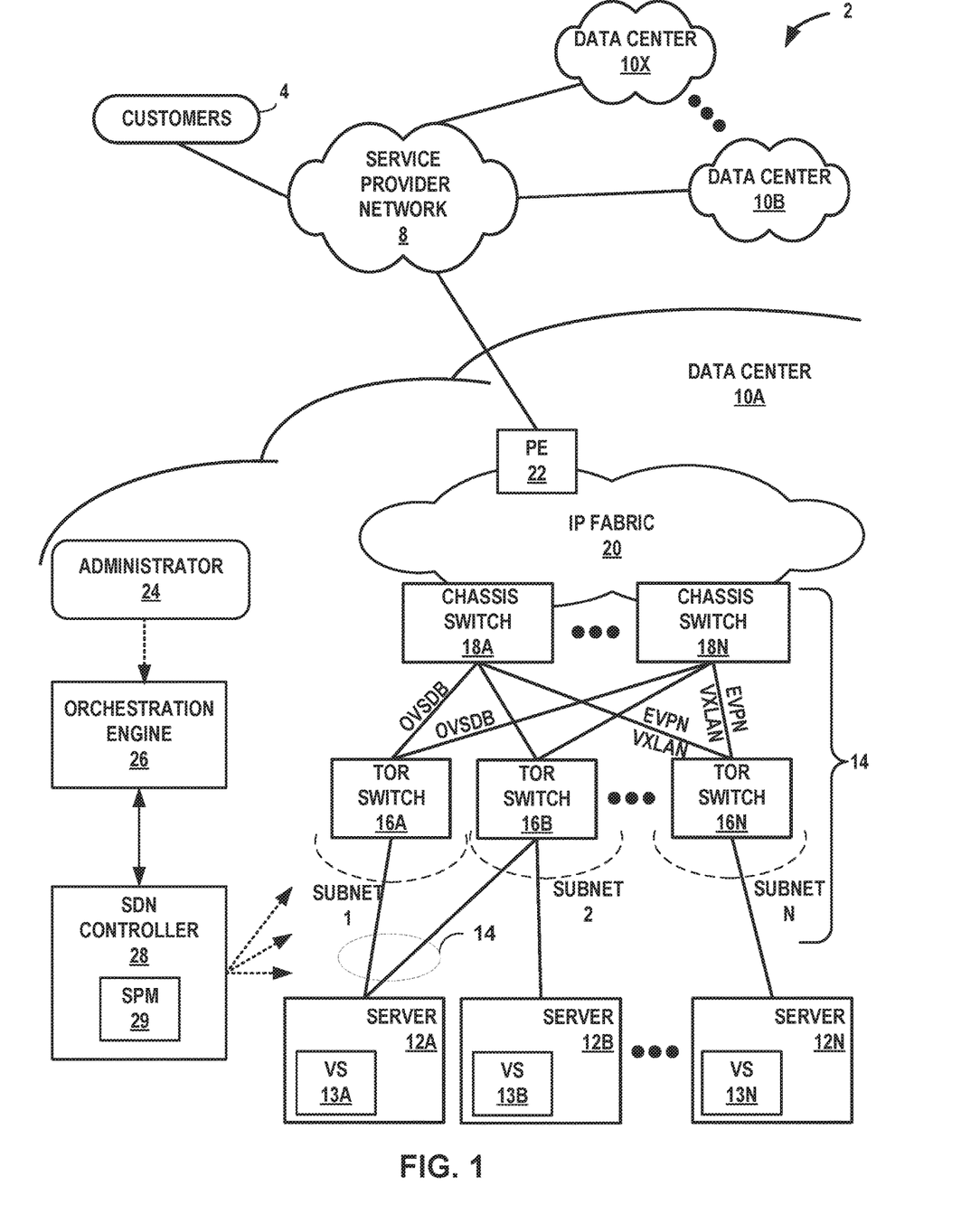
FIG. 1 is a block diagram illustrating an example network having a data center in which examples of the techniques described herein may be implemented.

FIG. 1 is a block diagram illustrating an example network system 2 in which examples of the techniques described herein may be implemented. Network system 2 includes data centers 10A-10X (collectively, "data centers 10") interconnected with one another and with customer networks associated with customers 4 via a service provider network 8. In some examples, each data center 10 may represent one of many geographically distributed network data centers. In general, each data center 10 provides an operating environment for applications and services for customers 4 coupled to the data center by service provider network 8. Data centers 10 may, for example, host infrastructure equipment, such as networking and storage systems, redundant power supplies, and environmental controls. Service provider network 8 may be coupled to one or more networks administered by other providers, and may thus form part of a large-scale public network infrastructure, e.g., the Internet.

Customers 4 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some examples, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16N (collectively, "TOR switches 16") coupled to a distribution layer of chassis switches 18A-18N (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

As further described below, servers 12 may include software or "virtual" switches 30A-30N (collectively, "virtual switches 30") that may forward traffic between different virtual machines on the same physical host and/or between virtual machines and the physical network (e.g., switch fabric 14, IP fabric 20). Various techniques may be used to transport packets within and across virtual networks over the physical network. As further described below, network devices of a data center may, for example, use multiple protocols to enable communication between the virtual network and the physical network. For example, a first protocol may be Open vSwitch database (OVSDB) management protocol, and the second protocol may be Ethernet Virtual Private Network (EVPN).

In this example, TOR switches 16 and chassis switches 18 provide servers 12 with redundant (multi-homed) connectivity to IP fabric 20 and service provider network 8. Chassis switches 18 aggregate traffic flows and provides high-speed connectivity between TOR switches 16. TOR switches 16 may be network devices that provide layer two (e.g., media access control (MAC)) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 4 by service provider network 8.

Provider edge device 22 ("PE device 22") may represent a gateway device, router, switch, or other suitable network device that participates in an L2 virtual private network ("L2VPN") service, such as EVPN. PE device 22 forwards and receives packets between IP fabric 20 and service provider network 8.

Software-Defined Network ("SDN") controller 28 provides a logically, and in some cases, physically centralized controller for facilitating operation of one or more virtual networks within each of data centers 10, such as data center 10A, in accordance with one or more examples of this disclosure. Virtual networks are logical constructs implemented on top of the physical network of data center 10A. In some examples, virtual networks may be implemented as a virtual private network (VPN), virtual LAN (VLAN), or the like. In some examples, SDN controller 28 may operate in response to configuration input received from an orchestration engine, e.g., orchestration engine 26, which in turn operates in response to configuration input received from network administrator 24. Representative orchestrators include Openstack, Kubernetes, Openshift and vCenter. Additional information regarding SDN controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 26 manages application-layer functions of data center 10 such as managing compute, storage, networking, and application resources executing on servers 12. For example, orchestration engine 26 may attach virtual machines (VMs) to a tenant's virtual network and generally manage the launching, migration and deconstruction of the VMs as needed. Each virtual machine may be referred to as a virtualized application workload (or just application workload) and generally represents a virtualized execution element, such as a VM or a container. Orchestration engine 26 may connect a tenant's virtual network to some external network, e.g. the Internet or a VPN.

In some examples, SDN controller 23 is a lower-level controller tasked with managing the network and networking services of data center 10A and, in particular, switch fabric 14 that provides connectivity between servers 12. SDN controller 28 utilizes a set of communication protocols to configure and control routing and switching elements of switch fabric 14 to create, for example, an overlay network, which generally refers to a set of tunnels for transporting packets to and from servers 12 within data center 10A.

In general, network devices of data center 10A may implement different protocols or techniques. For example, different vendors may provide network devices of a data center using different protocols, or a single vendor may provide network devices of a data center using different protocols. In one instance, a first vendor may provide one or more network devices of data center 10A (e.g., virtual switch 13A) that implement legacy protocols (e.g., OVSDB) to enable communication between virtual networks and physical networks, while a second vendor may provide one or more network devices of data center 10A (e.g., PE device 22) that implement non-legacy protocols (e.g., EVPN) to enable interconnection of multiple edges (e.g., virtual machines) within data center 10A.

In the example of FIG. 1, a first vendor may provide network devices (e.g., virtual switch 13A) that implement a first protocol, such as OVSDB. For example, the first vendor may provide a virtual switch 13A that is implemented based on Open vSwitch, which may be described in http://docs.openvswitch.org/en/latest/contents/. OVSDB is a protocol used to manage and configure Open vSwitch implementations. For example, OVSDB is used to extend the communication between workloads to servers, e.g., server 12A. The servers and workloads may be spawned on the same virtual network or different virtual networks. More specifically, OVSDB defines a network-accessible database system in which a schema of a database stores network addresses of network devices in the network and specifies the communication for OVSDB. OVSDB is used to configure one or more TOR switches, e.g., TOR switch 16A, to import and export dynamically learned network addresses (e.g., MAC addresses). In this way, OVSDB may be used for state synchronization by allowing network devices that implement OVSDB to monitor the contents of the database and to learn the current state of the network.

In the example of FIG. 1, a TOR service node ("TSN") and TOR agent is provisioned to operate with network devices implementing OVSDB. The TSN may operate as the multicast controller for the TOR switches, e.g., TOR switch 16A. That is, any BUM traffic from TOR switch 16A is sent to the TSN, and TSN replicates the traffic to the end hosts. In the other direction, BUM traffic from virtual machines are sent from the compute nodes to the TOR switch. As one example, when an Address Resolution Protocol (ARP) request from server 12A reaches TOR switch 16A, the TOR switch sends the ARP request to the TSN, which in turn floods the ARP request further. In some examples, the TSN may provide Dynamic Host Configuration Protocol (DHCP), e.g., as a DHCP server, to the servers or virtual instances running behind the TOR switch ports. For example, the TSN may lease IP addresses to the servers, along with other DCHP options configured in the system.

The TOR agent may operate as an OVSDB client for the TOR switch (e.g., TOR switch 16A), and the OVSDB interactions with the TOR switch are performed by using the TOR agent. For example, the TOR agent may receive configuration information for the TOR switch 16A, translate the configuration information to OVSDB, and programs different OVSDB tables in TOR switch 16A and receives the local unicast table entries from the TOR switch. That is, the MAC addresses learned in the TOR switch for different logical switches (e.g., entries from a local table in OVSDB) are propagated to the TOR agent, which exports the addresses to SDN controller 28. The SDN controller 28 distributes the addresses to other controllers and to the compute nodes.

Network devices that implement OVSDB may configure and/or communicate using, for example, JavaScript Object Notation (JSON) messages as described in D. Crockford, "The application/json Media Type for JavaScript Object Notation (JSON)," RFC 4627, July 2006, or JavaScript Object Notation remote procedure call (JSON-RPC) messages as described in "JSON-RPC 2.0 Specification," Jan. 4, 2013, the entire contents of both of which are incorporated by reference herein. Additional examples of OVSDB are described in B. Pfaff, et. al., "The Open vSwitch Database Management Protocol," Request for Comments 7047, December 2013, the entire contents of which are incorporated by reference herein.

While some network devices of data center 10A may implement the first protocol, other network devices of data center 10A (e.g., PE device 22) may implement a second protocol, such as EVPN. For example, a second vendor may provide PE device 22 that may implement EVPN that uses layer 2 (L2) overlays to interconnect multiple edges (e.g., virtual machines) within data center 10A. For example, virtual networks implemented by servers 12 may be connected to and extended across Ethernet Virtual Private Networks (EVPNs) using a datacenter edge router, e.g., PE device 22.

In particular, the EVPN transports L2 communications, such as Ethernet packets or "frames," between customer networks (e.g., virtual networks) via traffic engineered label switched paths ("LSP") through the intermediate L3 network in accordance with one or more multiprotocol label switching (MPLS) protocols. In a typical configuration, network devices on the edge of the service provider network 8 (e.g., PE device 22) define label switched paths within the service provider network to carry encapsulated L2 communications between virtual networks as if the virtual networks were directly attached. In some configurations, the network devices may also be connected by an IP infrastructure in which case IP/GRE tunneling or other IP tunneling can be used between the network devices.

In an EVPN, L2 address learning (also referred to as "MAC learning") occurs in the control plane rather than in the data plane using a routing protocol. For example, in EVPNs, a PE network device typically uses the Border Gateway Protocol ("BGP") (i.e., an L3 routing protocol) to advertise to SDN controller 28 the MAC addresses the network device has learned from a customer edge device, e.g., virtual machines of servers 12. As one example, PE device 22 may use a BGP route advertisement message to announce reachability information for the EVPN, where the BGP route advertisement specifies one or more MAC addresses learned by the PE device instead of L3 routing information. In turn, SDN controller 28 may use BGP to communicate the MAC addresses to network peers.

In general, network devices of data center 10A may provide similar services. For example, each of the network devices may be a router, switch, or other device for routing packets. However, different network devices may implement different protocols, such as OVSDB and EVPN protocols. In some examples, a network operator (e.g., administrator 24) may want network devices implemented with OVSDB to co-exist with network devices that implement EVPN or to migrate the OVSDB network devices to EVPN. EVPN may provide several example advantages over OVSDB. For example, EVPN may provide multi-homing support (e.g., EVPN multi-homing 14) for servers 12 that is not supported by OVSDB. EVPN may also provide multicast replication capability on a TOR switch itself. By migrating from OVSDB to EVPN, a TOR agent is no longer needed because MAC addresses are learned using EVPN routes. Moreover, by migrating from OVSDB to EVPN, the role of the TSN is limited to DHCP as multicast replication is handled by the TOR switch itself.

To manually configure network devices implementing different protocols, the administrator would need to consider multiple factors such as network infrastructure information, e.g., compute nodes, the technology and/or protocol implemented by the compute nodes, vendor specific information, etc. In accordance with the techniques described in this disclosure, SDN controller 28 may receive high-level intent-based input, e.g., from the administrator via a user interface to SDN controller 28, and automatically configure network devices implementing different protocols in the same way, e.g., by providing high-level configuration data (e.g., configuration instructions that describes "what" services need to be implemented) that is protocol agnostic, and translating the high-level configuration data into low-level configuration data (e.g., configuration instructions that describe "how" services are implemented) that is protocol specific.

In accordance with the techniques described in this disclosure, SDN controller 28 may include a service provisioning module 29 ("SPM 29") that configures and instantiates protocol specific configuration instructions to network devices of data center 10A that implement different protocols. More specifically, service provisioning module 29 is configured with multiple translation functions that translate high-level configuration data that are protocol or technology agnostic into low-level configuration data that are configured and communicated with a specific protocol or technology.

In the example of FIG. 1, a first vendor may provide one or more network devices (e.g., virtual switch 13A) that implement a legacy protocol, e.g., OVSDB, and a second vendor may provide one or more other network devices (e.g., PE device 22) that implement a non-legacy protocol, e.g., EVPN. In one instance, service provisioning module 29 may receive a high-level configuration data from orchestration engine 26 that describes a service (e.g., a virtual network overlay) to be implemented by network devices of data center 10A.

To configure network devices implemented with different protocols to create the service, for example, service provisioning module 29 may translate the high-level configuration data that is protocol agnostic into first low-level configuration data for network devices that implement OVSDB and second low-level configuration data for network devices that implement EVPN.

In one instance, service provisioning module 29 may collect and retrieve network infrastructure information to determine compute nodes that implement OVSDB (e.g., virtual switch 13A). Service provisioning module 29 may also determine the configuration protocol in which to instantiate the compute nodes (e.g., JSON), and the routing protocol in which to propagate routing information with the compute nodes (e.g., JSON). Service provisioning module 29 may translate high-level configuration data to low-level configuration data that is OVSDB specific. For example, service provisioning module 29 may construct a JSON message including the low-level configuration data and may send the JSON message to configure virtual switch 13A to implement the service. Service provisioning module 29 may also use JSON messages to propagate routing information with virtual switch 13A. In this way, service provisioning module 29 may send JSON messages to instantiate the service in OVSDB compatible network devices and send JSON messages to propagate routing information to OVSDB compatible devices, e.g., virtual switch 13A.

In another instance, service provisioning module 29 may collect and retrieve network infrastructure information to determine compute nodes that implement EVPN (e.g., PE device 22). Service provisioning module 29 may also determine the configuration protocol in which to instantiate the compute nodes (e.g., NETCONF), and the routing protocol in which to propagate routing information with the compute nodes (e.g., BGP). Service provisioning module 29 may translate the high-level configuration data into low-level configuration data that is EVPN specific. For example, service provisioning module 29 may construct a NETCONF message including the low-level configuration data and may send the NETCONF message to configure PE device 22 to implement the service. Service provisioning module 29 may also use BGP to propagate routing information with PE device 22. In this way, service provisioning module 29 may send NETCONF messages to instantiate the service in EVPN compatible network devices and send BGP messages to propagate routing information to EVPN compatible devices, e.g., PE device 22.

In some examples, the high-level configuration data may be expressed as a structured set of parameters, such as Yet Another Next Generation (YANG) as described in Bjorklund, "YANG—A Data Modeling Language for the Network Configuration Protocol (NETCONF)," Internet Engineering Task Force, RFC 6020, October 2010, available at tools.i-etf.org/html/rfc6020). In other examples, the high-level configuration data may be expressed as Extensible Markup Language (XML) schema. However, the network devices need not support YANG or other structured input schemas. Instead, the translation functions are configured to translate the input high-level configuration data into instructions that are protocol specific needed by the corresponding network devices. Additional examples of the translation functions are described in U.S. application Ser. No. 15/198,657, filed Jun. 30, 2016, and U.S. application Ser. No. 16/221,698, the entire contents of both of which are incorporated by reference herein.

In some examples, the low-level configuration data may be expressed as Python or Perl scripts used to perform a specific or narrow set of functions. In other examples, more complex automation tools such as Ansible (found in https://docs.ansible.com) and Puppet may be used. Ansible is a provisioning, configuration and deployment tool that relies on playbooks to define sequences of tasks. Ansible uses playbooks to describe automation jobs as tasks via a human friendly data serialization language named YAML. YAML is standardized language commonly used for configuration files. It can, however, be used in any application where data is stored. YAML is very easy for humans to understand, read and write and can be used advantageously in an application like Ansible to describe and document playbooks. Puppet is a configuration management tool used to simplify the defining of IT infrastructure as code and the enforcement of system configurations.

The techniques may provide one or more example technical advantages. For example, by providing an SDN controller to translate high-level configuration data that are protocol agnostic into low-level configuration data that are protocol specific, an administrator need not consider multiple factors associated with the underlying device infrastructure, such as network infrastructure and the technology or protocols of the network devices, when configuring network devices for a system in which network devices implementing multiple protocols co-exist and/or evolve from using one protocol to another.

Figure 2:
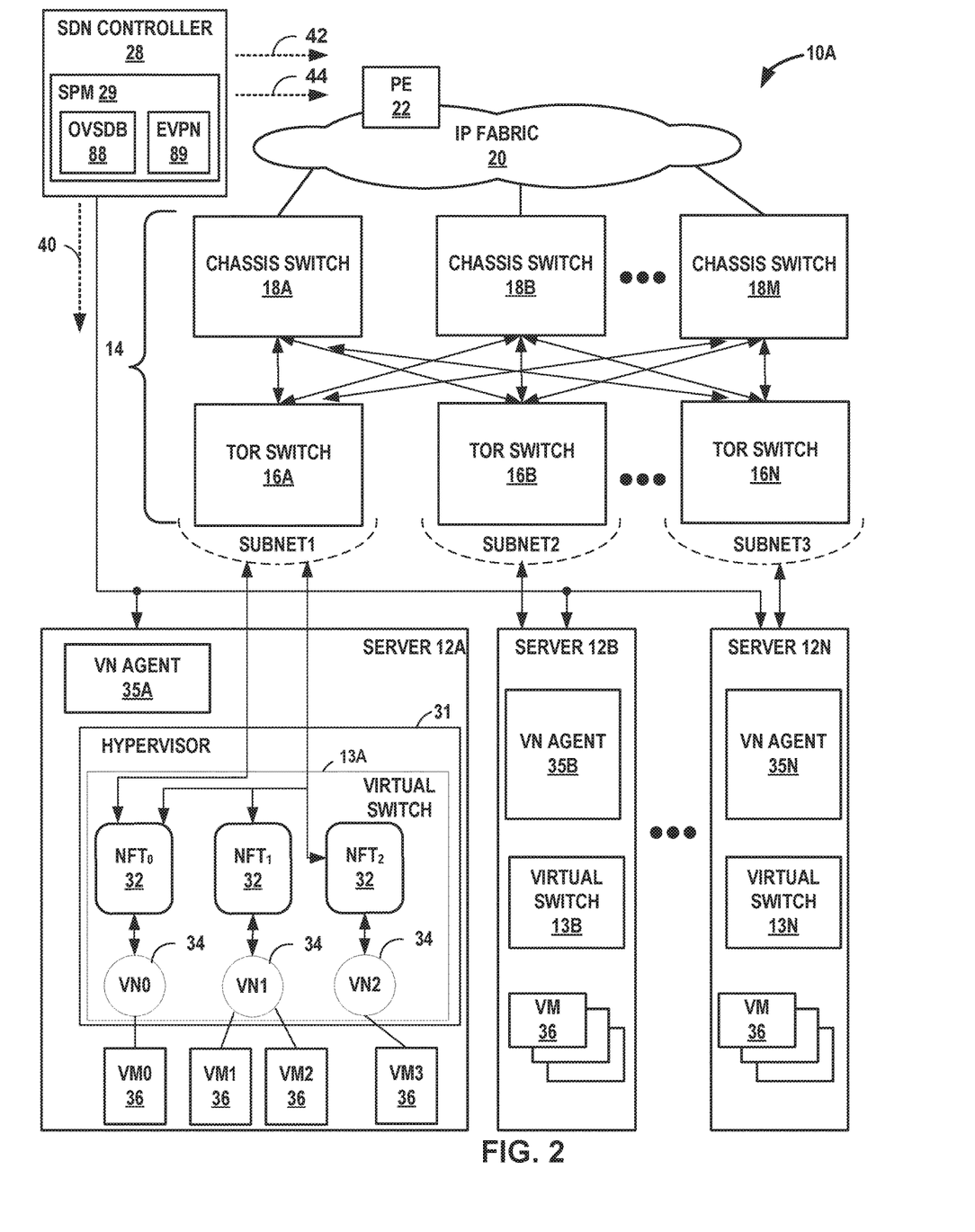
FIG. 2 is a block diagram illustrating an example implementation of the data center of FIG. 1 in further detail, according to the techniques described herein.

FIG. 2 is a block diagram illustrating an example implementation of data center 10A of FIG. 1 in further detail. In the example of FIG. 2, data center 10A includes interconnections that extend switch fabric 14 from physical switches 16, 18 to virtual switches 13. Virtual switches 13 dynamically create and manage one or more virtual networks 34 usable for communication between application instances. As one example, virtual switches 13 execute the virtual network as an overlay network, which provides the capability to decouple an application's virtual address from a physical address (e.g., IP address) of the one of servers 12A-12N ("servers 12") on which the application is executing. Each virtual network may use its own addressing and security scheme and may be viewed as orthogonal from the physical network and its addressing scheme.

Each virtual switch 13 may execute within a hypervisor, a host operating system or other component of each of servers 12. Each of servers 12 may represent an x86 or other general-purpose or special-purpose server capable of executing virtual machines 36. In the example of FIG. 2, virtual switch 13A executes within hypervisor 31, also often referred to as a virtual machine manager (VMM), which provides a virtualization platform that allows multiple operating systems to concurrently run on one of servers 12. In the example of FIG. 2, virtual switch 13A manages virtual networks 34, each of which provides a network environment for execution of one or more virtual machines 36 ("VMs 36") on top of the virtualization platform provided by hypervisor 31. Each VM 36 is associated with one of the virtual networks VN0-VN2 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing application workloads.

In general, each VM 36 may be any type of software application and may be assigned a virtual address for use within a corresponding virtual network 34, where each of the virtual networks may be a different virtual subnet provided by virtual switch 13A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35N (collectively, "VN agents 35") that controls virtual networks 34 and that coordinates the routing of data packets within server 12. In general, each VN agent 35 communicates with SDN controller 28, which generates commands to control routing of packets through data center 10A. VN agents 35 may operate as a proxy for control plane messages between virtual machines 36 and SDN controller 28. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual switches 13, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more tunnels for interconnecting different types of application workloads (e.g., VMs). Besides IP-in-IP, other example tunneling protocols that may be used include IP over GRE, VxLAN, MPLS over GRE, MPLS over UDP, etc.

As noted above, SDN controller 28 provides a logically centralized controller for facilitating operation of one or more virtual networks within data center 10A. SDN controller 28 may, for example, maintain a routing information base, e.g., one or more routing tables that store routing information for the physical network as well as one or more networks of data center 10A. Similarly, physical switches 16, 18 and virtual switches 13 maintain routing information, such as one or more routing and/or forwarding tables. In one example implementation, virtual switch 13A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In accordance with the techniques described herein, SDN controller 28 includes, in this example, a service provisioning module 29 ("SPM 29") configured to determine and drive protocol specific configuration instructions to network devices of data center 10A that implement different protocols. Service provisioning module 29 is configured with multiple translation functions that translate high-level configuration data that are protocol agnostic into low-level configuration data that are configured with a specific protocol or technology.

In the example of FIG. 2, virtual switch 13A may implement OVSDB and PE device 22 may implement EVPN. In one instance, service provisioning module 29 may receive high-level configuration data (e.g., from orchestration engine 26 of FIG. 1) describing a network service (e.g., a virtual network overlay) to be implemented by virtual switch 13A and PE device 22. In this example, service provisioning module 29 may translate the high-level configuration data that is protocol agnostic into low-level configuration data that is protocol specific to OVSDB and EVPN, respectively, and instantiate the low-level configuration data in the network devices implementing different protocols. For example, service provisioning module 29 may translate the high-level configuration data into low-level configuration data that is specific to OVSDB for virtual switch 13A to create the required connectivity and to execute the network service, e.g., executing a virtual network (e.g., VN0) as an overlay network. Similarly, service provisioning module 29 may translate the high-level configuration data into low-level configuration data that is specific to EVPN for PE device 22 to create the required connectivity to the overlay network.

To translate the high-level configuration data that is protocol agnostic into a low-level configuration data that is OVSDB specific, service provisioning module 29 may collect and retrieve infrastructure information of network devices implementing OVSDB. For example, service provisioning module 29 may collect and retrieve network infrastructure information that identifies one or more compute nodes that implement OVSDB and the protocol or technology implemented by the compute nodes (e.g., JSON). In the example of FIG. 2, service provisioning module 29 may determine, based on the OVSDB specific network infrastructure information, that virtual switch 13A implements OVSDB and the configuration and routing protocol is JSON. Service provisioning module 29 may include an OVSDB module 88 (as further described in FIG. 3) that translates the high-level configuration data into low-level configuration data that is OVSDB specific. For example, OVSDB module 88 may construct a JSON message, e.g., JSON message 40, that includes the low-level configuration data. SDN controller 28 sends the JSON message 40 to configure virtual switch 13A to create the required connectivity and to execute a virtual network (e.g., VN0) as an overlay network to implement the service. Service provisioning module 29 may also propagate routing information with virtual switch 13A using JSON messages.

Similarly, service provisioning module 29 may translate the high-level configuration data that is protocol agnostic into a low-level configuration data that is EVPN specific. For example, service provisioning module 29 may collect and retrieve network infrastructure information of network devices that identifies one or more network devices that implement EVPN and the protocol or technology implemented by the network devices (e.g., NETCONF/BGP). In the example of FIG. 2, service provisioning module 29 may determine, based on the EVPN specific network infrastructure information, that PE device 22 implements EVPN, the configuration protocol is NETCONF, and the routing protocol is BGP. Service provisioning module 29 may include an EVPN module 89 (as further described in FIG. 3) that translates the high-level configuration data into low-level configuration data that is EVPN specific. For example, EVPN module 89 may construct a NETCONF message 42 including the low-level configuration. SDN controller 28 may send the NETCONF message 42 to configure PE device 22 to create the required connectivity to execute the service. In some examples, EVPN module 89 may invoke Ansible playbooks that use the low-level configuration data as attributes to be parsed into configuration data that is injected to NETCONF compatible devices. Service provisioning module 29 may also propagate routing information with PE device 22 using BGP messages 44.

Figure 3:
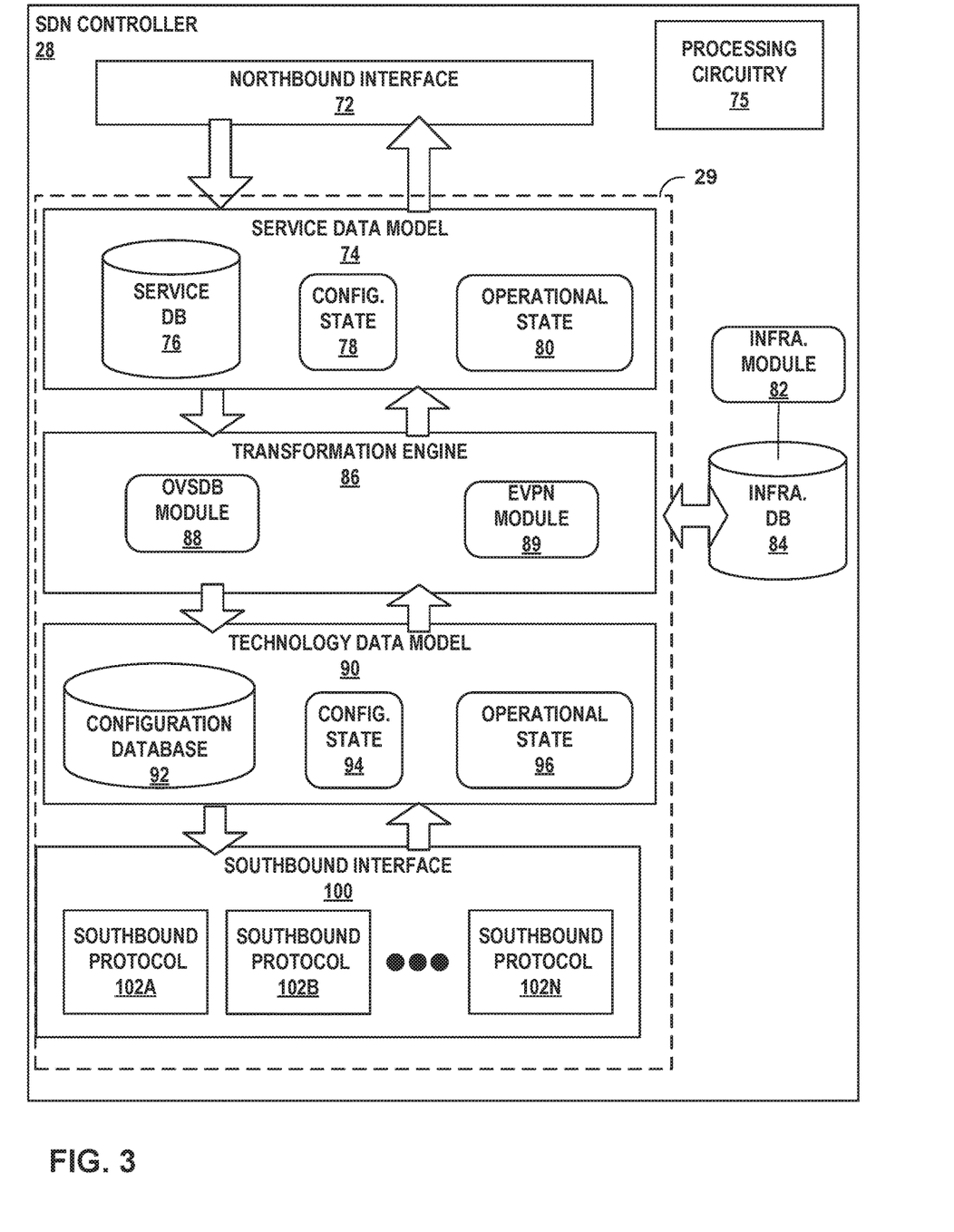
FIG. 3 is a block diagram illustrating an example instance of an SDN controller according to techniques described in this disclosure.

FIG. 3 is a block diagram illustrating an example instance of software-defined networking (SDN) controller 28, in accordance with one or more techniques of this disclosure. SDN controller 28 is a logically centralized but in some cases physically distributed controller for a network that may be configured to manage configurations of one or more network devices, such as servers 12, TOR switches 16, chassis switches 18, and PE device 22 of FIG. 1. SDN controller 28 includes, in this example, a service provisioning module 29 configured to manage configurations of one or more network devices of a data center (e.g., physical switches 16,18, virtual switches 13, PE device 22 of FIG. 1). SDN controller 28 of FIG. 3 may represent an example instance of SDN controller 28 of FIGS. 1-2. Service provisioning module 29 of FIG. 3 may represent an example instance of service provisioning module 29 of FIGS. 1-2.

SDN controller 28 may include processing circuitry 75. Processing circuitry 75 may include one or more processors that are configured to implement functionality and/or process instructions for execution within SDN controller 28. For example, processing circuitry 75 may include, for example, microprocessors, DSPs, ASICs, FPGAs, or equivalent discrete or integrated logic circuitry, or a combination of any of the foregoing devices or circuitry.

Some components of SDN controller 28 are not shown for ease of illustration purposes. These components may include hardware and instructions to execute modules of SDN controller 28. SDN controller 28 presents a northbound interface 72 that interfaces with an orchestrator (e.g., orchestration engine 26 of FIG. 1), administrator (e.g., administrator 24), or other entity to install configuration state using a high-level data model, e.g., service data model 74. More specifically, northbound interface 72 that may be invoked to modify configuration state 78 ("config. state 78") or extract operational state 80 of the SDN controller 28 that is descriptive of the service data model 74. Northbound interface 72 may be used for integration with an orchestration system such as OpenStack; northbound interface 72 may also or alternatively be used by other applications or the operator's Operations Support Systems (OSS)/Business Support Systems (BSS). Northbound interface 72 may in some cases present a RESTful Application Programming Interface (API).

Service database 76 stores objects that represent instantiated services within a formal service data model 74. The formal service data model 74 is a high-level service data model used to describe the services that need to be implemented; each high-level service data model has an associated low-level technology data model, e.g., technology data model 90, that describes how those services need to be implemented. Each data model consists of a set of objects, their capabilities, and the relationships between them.

Transformation engine 86 transforms the service objects in service database 76 from the high-level service data model 74 to corresponding lower-level objects in the technology data model 90. Transformation engine 86 may include a schema transformer. In this sense, transformation engine 86 operates as a compiler to transform the service data model 74 to the technology data model 90. That is, transformation engine 86 may "map" the service data model 74 to the technology data model 90 to describe how the services described in the high-level service data model are to be implemented. Whereas the high-level service data model 74 describes services previously requested and instantiated or being processed for eventual instantiation with the network segment under control of SDN controller 28, the low-level technology data model 90 describes how those services are implemented or are to be implemented within the network, as represented in configuration database 92. Configuration database 92 may include, for example, an object that describes a traffic engineered label switched path or tunnel that at least partially implements a service in service database 76. Configuration database 92 further includes identifiers of network resources of the network managed by SDN controller 28, such as network devices of data center 10A (e.g., servers 12). The technology data model 90 includes configuration state 94 that describes respective configurations of the network elements (e.g., routing instances and forwarding policy) as well as operational state 96 that describes respective operational characteristics of the network elements, such as load, available bandwidth, etc.

Put another way, the high-level service data model 74 describes the desired state of the network under the control of SDN controller 28 at a very high level of abstraction that is protocol agnostic, using objects that map directly to services provided to end users—for example, a virtual network (e.g., a virtual overlay network), a connectivity policy (e.g., connectivity between workloads and endpoints such as VMs or bare metal servers), or a security policy. The low-level technology data model 90, on the other hand, describes the desired state of the network at a very low level of abstraction, using objects that map to specific network protocol constructs (e.g., routing instances). Accordingly, southbound interface 100 executes one or more southbound protocols 102A-102N (collectively, "southbound protocols 102") with which SDN controller 28 may obtain configuration state 94 and operational state 96 from and inject configuration state 94 and operational state 96 into a network segment under the control of SDN controller 28, where configuration state 94 and operational state 96 store objects intelligible to southbound protocols 102 and mapped to constructs of southbound protocols 102. For example, SDN controller 28 may include an Interface to Metadata Access Points (IF-MAP) server that provides a southbound API to push computed low-level configuration data to a control unit (not shown in FIG. 3) that implements a logically centralized portion of the control plane. In this way, service provisioning module 29 may make the state of the network under control of SDN controller 28 match the desired state of the network as received by service provisioning module 29 via northbound interface 72 and represented by service data model 74.

Southbound protocols 102 may include protocols for path provisioning as well as for topology discovery. For example, southbound protocol 102A may include JSON or JSON-RPC used to control network devices that implement OVSDB. Southbound protocol 102B may include BGP and NETCONF/YANG to control physical network devices (e.g., PE device 22, physical switches 16, 18). Southbound protocol 102N may include BGP to propagate routing information for network devices that implement EVPN. Southbound protocols 102 may also include other protocols such as Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), Interface to the Routing System (I2RS) protocols, CLIs for the network elements, and SNMP.

In accordance with the techniques of this disclosure, service provisioning module 29 may include OVSDB module 88 and EVPN module 89 that are each configured to translate high-level configuration data that is protocol agnostic to low-level configuration data that is protocol specific. For example, infrastructure module 82 ("infra. module 82") may collect and retrieve network infrastructure information and may store this information to infrastructure database 84 ("INFRA. DB 84"). Network infrastructure information may include information about the compute nodes and/or network devices of the network, the technology or protocol implemented by the compute nodes or network devices, vendor specific information, etc. Service provisioning module 29 may perform a lookup of the network infrastructure information in infrastructure database 84 to determine the network devices for which to translate high-level configuration data to low-level configuration data, and configuration and routing protocols to communicate with the network devices.

In one instance, the service objects in service database 76 from the high-level service data model 74 is parsed to OVSDB module 88 to translate the high-level service objects to low-level objects in the technology data model 90 that are OVSDB specific. For example, OVSDB module 88 may implement a first translation function to translate the high-level service objects to low-level objects constructed as JSON messages and store the objects in configuration database 92. SDN controller 28 may then inject low-level objects in configuration database 92 and configuration state 94 into a network segment under the control of SDN controller 28 to create the required connectivity and execution of the service. Service provisioning module 29 may inject low-level objects in configuration database 92 and configuration state 94 using one or more southbound protocols 102. For example, service provisioning module 29 may use southbound protocol 102A (e.g., JSON) to inject low-level objects in configuration database 92 and configuration state 94 in OVSDB compatible devices and may also use southbound protocol 102A to send and receive routing information with the OVSDB compatible devices.

Alternatively, or additionally, the service objects in service database 76 from the high-level service data model 74 is parsed to EVPN module 89 may implement a second translation function to translate the high-level service objects to low-level objects in the technology data model 90 that are EVPN specific. For example, EVPN module 89 may translate the high-level service objects to low-level objects constructed as NETCONF messages and store the objects in configuration database 92. In one example, the second translation function may implement Ansible that uses the low-level objects as attributes to be parsed into configuration information that is injected to NETCONF compatible devices (e.g., physical devices implementing EVPN). More specifically, SDN controller may configure an Ansible playbook that operates on one or more network devices, e.g., PE device 22. Each play specifies PE device 22 on which the tasks operate, the list of tasks to execute on PE device 22, and any required variables or module parameters. These modules may include configuration instructions to manage configuration information of PE device 22, specify a port to use when building a connection from PE device 22 to a remote device (e.g., virtual switch 13A), manage layer 2 (L2) and/or layer 3 (L3) interfaces of PE device 22, manage VLANs on PE device 22, and other configuration instructions. SDN controller 28 may then inject low-level objects in configuration database 92 and configuration state 94 into a network segment under the control of SDN controller 28 to create the required connectivity and execution of the service. Service provisioning module 29 may inject low-level objects in configuration database 92 and configuration state 94 using one or more southbound protocols 102. For example, service provisioning module 29 may use southbound protocol 102B (e.g., NETCONF) to inject low-level objects in configuration database 92 and configuration state 94 in EVPN compatible devices. Service provisioning module 29 may also use southbound protocol 102N (e.g., BGP) to send and receive routing information with the EVPN compatible devices.

Figure 4:
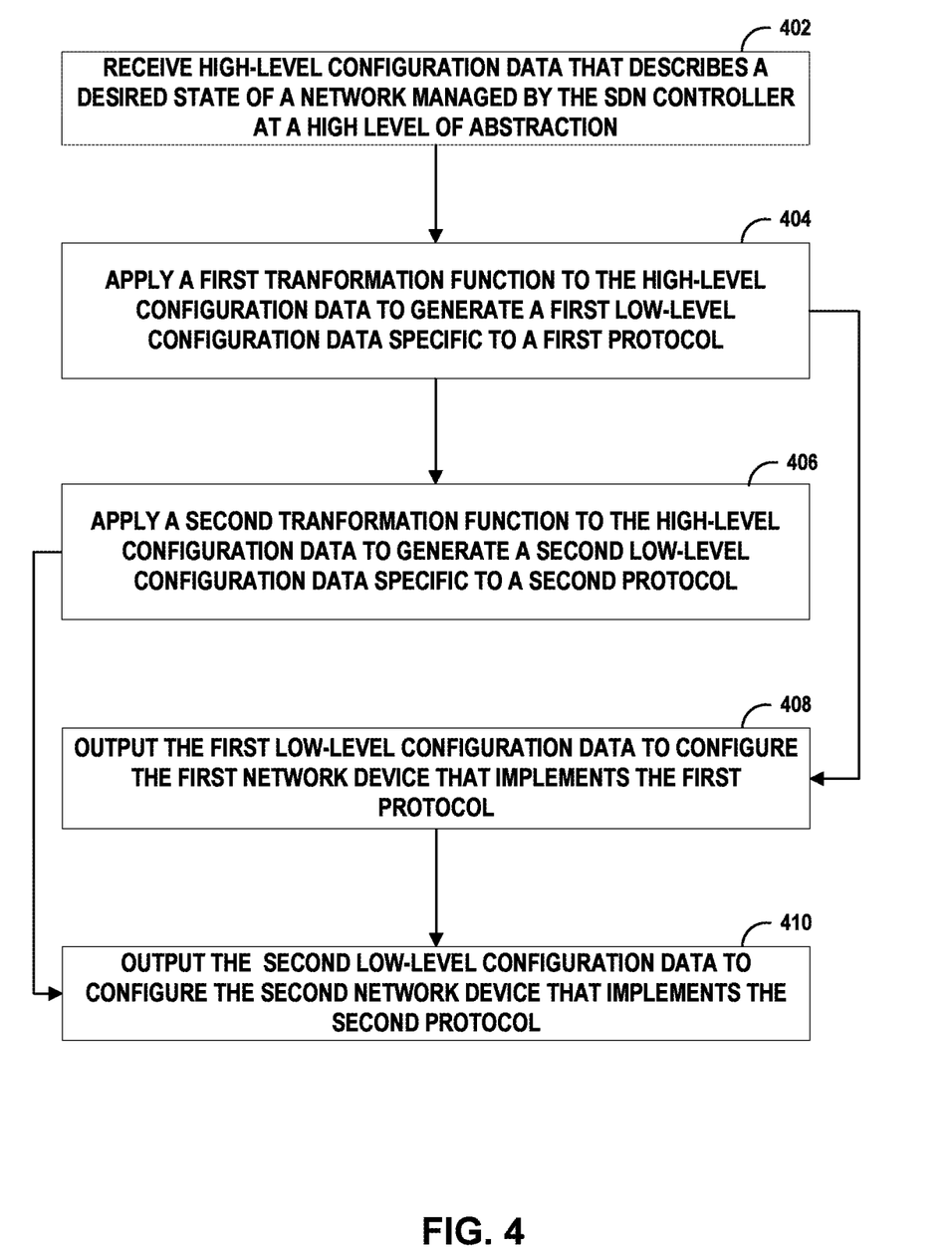
FIG. 4 is a flowchart illustrating an example operation of an SDN controller according to techniques described in this disclosure.

Although illustrated with OVSDB module 88 and EVPN module 89, service provisioning module 29 may include modules of any two or more different protocols to collect and retrieve network infrastructure information that is used to generate protocol specific low-level configuration data FIG. 4 is a flowchart illustrating an example operation in accordance with the techniques of the disclosure. For convenience, FIG. 4 is described with respect to FIGS. 1, 2, and 3. In the example of FIG. 4, SDN controller 28 may receive high-level configuration that describes a desired state of a network managed by the SDN controller at a high level of abstraction (402). For example, SDN controller 28 may receive from orchestration engine 26 high-level configuration data to actuate a service. The high-level configuration data may include information that describes a desired state of network 2 at a high level of abstraction that is protocol agnostic. That is, the high level configuration data may specify "what" services need to be implemented without specifying the protocol for which compute nodes and/or network devices may use to implement the service.

In some examples, SDN controller 28 may parse the high-level configuration data and determine two or more network devices must be configured to carry out the desired state of the network expressed by the high-level configuration data. In response to determining the two or more network devices, SDN controller 28 may determine a respective protocol to use for configuring individual ones of the two or more network devices, where at least two different protocols must be used for different network devices.

SDN controller 28 may apply a first transformation function to the high-level configuration data to generate a first low-level configuration data specific to the first protocol (404). For example, high-level service data model 74 may parse high-level objects in service database 76 to OVSDB module 88. OVSDB module 88 may implement a first translation function to translate high-level configuration data to low-level configuration data that is OVSDB specific. As one example, OVSDB module 88 may receive high-level service objects from the high-level service data model 74 and construct a JSON message including the low-level objects in technology data model 90.

SDN controller 28 may apply a second transformation function to the high-level configuration data to generate a second low-level configuration data specific to the second protocol (406). For example, high-level service data model 74 may parse high-level objects in service database 76 to EVPN module 89. EVPN module 89 may implement a second translation function to translate high-level configuration data to low-level configuration data that is EVPN specific. As one example, EVPN module 89 may receive high-level service objects from the high-level service data model 74 and construct a NETCONF message including the low-level objects in technology data model 90. In some examples, SDN controller 28 may use Ansible, which uses the low-level objects as attributes to be parsed into configuration that are injected to the network device.

In response to applying the first transformation function, SDN controller 28 may output, using the first protocol, the first low-level configuration data to configure the first network device that implements the first protocol (408). For example, SDN controller 28 may inject low-level objects in configuration database 92 and configuration state 94 that are specific to OVSDB into network devices that implement OVSDB (e.g., virtual switch 13A) to create the required connectivity and execution of the service (e.g., virtual network overlay). In this example, service provisioning module 29 may use southbound protocol 102A (e.g., JSON) to inject the low-level objects stored in configuration database 92 and configuration state 94 in OVSDB compatible devices and use southbound protocol 102A to send and receive routing information with the OVSDB compatible devices.

In response to applying the second transformation function, SDN controller 28 may output, using the second protocol, the second low-level configuration data to configure the second network device that implements the second protocol (410). For example, SDN controller 28 may inject low-level objects in configuration database 92 and configuration state 94 that are specific to EVPN into a network segment under the control of SDN controller 28 to create the required connectivity and execution of the service in PE device 22. Service provisioning module 29 may use southbound protocol 102B (e.g., NETCONF) to inject the low-level objects in configuration database 92 and configuration state 94 in EVPN compatible devices and use southbound protocol 102N (e.g., BGP) to send and receive routing information with the EVPN compatible devices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
   receiving, by a software defined networking (SDN) controller, high-level configuration data that describes a desired state of a network that includes a plurality of network devices managed by the SDN controller at a high level of abstraction,
     wherein a first network device of the plurality of network devices implements a first protocol and a second network device of the plurality of network devices implements a second protocol,
     wherein the first protocol and the second protocol are different protocols for communicating between a virtual network and a physical network, and
     wherein the high-level configuration data is protocol agnostic;
   applying, by the SDN controller, a first transformation function to the high-level configuration data to generate a first low-level configuration data specific to the first protocol;
   applying, by the SDN controller, a second transformation function to the high-level configuration data to generate a second low-level configuration data specific to the second protocol;
   in response to applying the first transformation function, outputting, by the SDN controller and to the first network device that implements the first protocol, the first low-level configuration data specific to the first protocol to configure the first network device that implements the first protocol; and
   in response to applying the second transformation function outputting, by the SDN controller and to the second network device that implements the second protocol, the second low-level configuration data specific to the second protocol to configure the second network device that implements the second protocol.

2. The method of claim 1,
   wherein applying the first transformation function to the high-level configuration data comprises:
     determining a first configuration protocol used to configure the first low-level configuration data in the first network device, and
     constructing, based on the first configuration protocol, a first message to include the first low-level configuration data;
   wherein applying the second transformation function to the high-level configuration data comprises:
     determining a second configuration protocol used configure the second low-level configuration data in the second network device, and
     constructing, based on the second configuration protocol, a second message to include the second low-level configuration data.

3. The method of claim 2,
   wherein the first protocol for communicating between the virtual network and the physical network comprises an Open Virtual Switch database (OVSDB) management protocol,
   wherein the first configuration protocol comprises a JavaScript Object Notation (JSON) protocol or JSON Remote Procedure Call (RPC) protocol, wherein the second protocol for communicating between the virtual network and the physical network comprises an Ethernet Virtual Private Networking (EVPN) protocol, and wherein the second configuration protocol comprises a Network Configuration (NETCONF) protocol.

4. The method of claim 1, wherein applying the first transformation function to the high-level configuration data comprises:
  determining a protocol to propagate first routing information to the first network device, and wherein applying the second transformation function to the high-level configuration data comprises:
  determining a protocol to propagate second routing information to the second network device, wherein the protocol to propagate the first routing information is a different protocol than the protocol to propagate the second routing information.

5. The method of claim 4, wherein the first protocol for communicating between the virtual network and the physical network comprises an Open Virtual Switch database (OVSDB) management protocol, wherein the protocol to propagate the first routing information to the first network device comprises a JavaScript Object Notation (JSON) protocol or JSON Remote Procedure Call (RPC) protocol, wherein the second protocol for communicating between the virtual network and the physical network comprises an Ethernet Virtual Private Networking (EVPN) protocol, and wherein the protocol to propagate the second routing information to the second network device comprises a Border Gateway Protocol (BGP).

6. The method of claim 1, wherein the first protocol for communicating between the virtual network and the physical network comprises an Open Virtual Switch database (OVSDB) management protocol, wherein the second protocol for communicating between the virtual network and the physical network comprises an Ethernet Virtual Private Network (EVPN) protocol, wherein the first translation function is configured to construct the first low-level configuration data into a JavaScript Object Notation (JSON) protocol message, and wherein the second translation function is configured to construct the second low-level configuration data into a Network Configuration (NETCONF) protocol message.

7. The method of claim 6, wherein the second translation function is further configured to construct an Ansible playbook for the second network device.

8. A software defined networking (SDN) controller comprising:

a memory;

one or more processors coupled to the memory, wherein the one or more processors are configured to:
  receive high-level configuration data that describes a desired state of a network that includes a plurality of network devices managed by the SDN controller at a high level of abstraction,
    wherein a first network device of the plurality of network devices implements a first protocol and a second network device of the plurality of network devices implements a second protocol, wherein the first protocol and the second protocol are different protocols for communicating between a virtual network and a physical network, and wherein the high-level configuration data is protocol agnostic;

apply a first transformation function to the high-level configuration data to generate a first low-level configuration data specific to the first protocol;

apply a second transformation function to the high-level configuration data to generate a second low-level configuration data specific to the second protocol;

output, in response to applying the first transformation function and to the first network device that implements the first protocol, the first low-level configuration data specific to the first protocol to configure the first network device that implements the first protocol; and output, in response to applying the second transformation function and to the second network device that implements the second protocol, the second low-level configuration data specific to the second protocol to configure the second network device that implements the second protocol.

9. The SDN controller of claim 8, wherein, to apply the first transformation function to the high-level configuration data, the one or more processors are configured to:
  determine a first configuration protocol used to configure the first low-level configuration data in the first network device, and
  construct, based on the first configuration protocol, a first message to include the first low-level configuration data; and wherein, to apply the second transformation function to the high-level configuration data, the one or more processors are configured to:
  determine a second configuration protocol used instantiate the second low-level configuration data in the second network device, and
  construct, based on the second configuration protocol, a second message to include the second low-level configuration data.

10. The SDN controller of claim 9, wherein the first protocol for communicating between the virtual network and the physical network comprises an Open Virtual Switch database (OVSDB) management protocol, wherein the first configuration protocol comprises a JavaScript Object Notation (JSON) protocol or JSON Remote Procedure Call (RPC) protocol, wherein the second protocol for communicating between the virtual network and the physical network comprises an Ethernet Virtual Private Networking (EVPN) protocol, and wherein the second configuration protocol comprises a Network Configuration (NETCONF) protocol.

11. The SDN controller of claim 8, wherein, to apply the first transformation function to the high-level configuration data, the one or more processors are configured to:
  determine a protocol to propagate first routing information to the first network device, and wherein, to apply the second transformation function to the high-level configuration data, the one or more processors are configured to:

determine a protocol to propagate second routing information to the second network device, wherein the protocol to propagate the first routing information is a different protocol than the protocol to propagate the second routing information.

12. The SDN controller of claim 11,
wherein the first protocol for communicating between the virtual network and the physical network comprises an Open Virtual Switch database (OVSDB) management protocol,
wherein the protocol to propagate the first routing information to the first network device comprises a JavaScript Object Notation (JSON) protocol or JSON Remote Procedure Call (RPC) protocol,
wherein the second protocol for communicating between the virtual network and the physical network comprises an Ethernet Virtual Private Networking (EVPN) protocol, and
wherein the protocol to propagate the second routing information to the second network device comprises a Border Gateway Protocol (BGP).

13. The SDN controller of claim 8,
wherein the first protocol for communicating between the virtual network and the physical network comprises an Open Virtual Switch database (OVSDB) management protocol,
wherein the second protocol for communicating between the virtual network and the physical network comprises an Ethernet Virtual Private Network (EVPN) protocol
wherein the first translation function is configured to construct the first low-level configuration data into a JavaScript Object Notation (JSON) protocol message, and
wherein the second translation function is configured to construct the second low-level configuration data into a Network Configuration (NETCONF) protocol message.

14. The SDN controller of claim 13,
wherein the second translation function is further configured to construct an Ansible playbook for the second network device.

15. A non-transitory computer-readable storage medium comprising instructions for causing one or more programmable processors to:
receive high-level configuration data that describes a desired state of a network that includes a plurality of network devices managed by the SDN controller at a high level of abstraction,
wherein a first network device of the plurality of network devices implements a first protocol and a second network device of the plurality of network devices implements a second protocol,
wherein the first protocol and the second protocol are different protocols for communicating between a virtual network and a physical network, and
wherein the high-level configuration data is protocol agnostic;
apply a first transformation function to the high-level configuration data to generate a first low-level configuration data specific to the first protocol;
apply a second transformation function to the high-level configuration data to generate a second low-level configuration data specific to the second protocol;
output, in response to applying the first transformation function and to the first network device that implements the first protocol, the first low-level configuration data specific to the first protocol to configure the first network device that implements the first protocol; and
output, in response to applying the second transformation function and to the second network device that implements the second protocol, the second low-level configuration data specific to the second protocol to configure the second network device that implements the second protocol.

16. The non-transitory computer-readable storage medium of claim 15,
wherein, to apply the first transformation function to the high-level configuration data, the instructions cause the one or more programmable processors to:
determine a first configuration protocol used to configure the first low-level configuration data in the first network device, and
construct, based on the first configuration protocol, a first message to include the first low-level configuration data; and
wherein, to apply the second transformation function to the high-level configuration data, the instructions cause the one or more programmable processors to:
determine a second configuration protocol used configure the second low-level configuration data in the second network device, and
construct, based on the second configuration protocol, a second message to include the second low-level configuration data.

17. The non-transitory computer-readable storage medium of claim 16,
wherein the first protocol for communicating between the virtual network and the physical network comprises an Open Virtual Switch database (OVSDB) management protocol,
wherein the first configuration protocol comprises a JavaScript Object Notation (JSON) protocol or JSON Remote Procedure Call (RPC) protocol,
wherein the second protocol for communicating between the virtual network and the physical network comprises an Ethernet Virtual Private Networking (EVPN) protocol, and
wherein the second configuration protocol comprises a Network Configuration (NETCONF) protocol.

18. The non-transitory computer-readable storage medium of claim 15,
wherein, to apply the first transformation function to the high-level configuration data, the instructions cause the one or more programmable processors to:
determine a protocol to propagate first routing information to the first network device, and
wherein, to apply the second transformation function to the high-level configuration data, the instructions cause the one or more programmable processors to:
determine a protocol to propagate second routing information to the second network device, wherein the protocol to propagate the first routing information is a different protocol than the protocol to propagate the second routing information.

19. The non-transitory computer-readable medium of claim 18,
wherein the first protocol for communicating between the virtual network and the physical network comprises an Open Virtual Switch database (OVSDB) management protocol,
wherein the protocol to propagate the first routing information to the first network device comprises a JavaScript Object Notation (JSON) protocol or JSON Remote Procedure Call (RPC) protocol, wherein the second protocol for communicating between the virtual network and the physical network comprises an Ethernet Virtual Private Networking (EVPN) protocol, and wherein the protocol to propagate the second routing information to the second network device comprises a Border Gateway Protocol (BGP).

20. The non-transitory computer-readable medium of claim 15, wherein the first protocol for communicating between the virtual network and the physical network comprises an Open Virtual Switch database (OVSDB) management protocol, wherein the second protocol for communicating between the virtual network and the physical network comprises an Ethernet Virtual Private Network (EVPN) protocol wherein the first translation function is configured to construct the first low-level configuration data into a JavaScript Object Notation (JSON) protocol message, and wherein the second translation function is configured to construct the second low-level configuration data into a Network Configuration (NETCONF) protocol message.

* * * * *